United States Patent

Wehrmeister et al.

[11] 3,764,614
[45] Oct. 9, 1973

[54] F.E.S. DERIVATIVES
[75] Inventors: Herbert L. Wehrmeister, Terre Haute, Ind.; Wilbert H. Urry, Chicago, Ill.
[73] Assignee: Commercial Solvents Corporation, Terre Haute, Ind.
[22] Filed: Feb. 16, 1970
[21] Appl. No.: 11,879

[52] U.S. Cl. ............. 260/343.2 F, 424/279, 99/2 G
[51] Int. Cl. ............................................. C07d 9/00
[58] Field of Search ............................. 260/343.2 F

[56] References Cited
UNITED STATES PATENTS
3,503,994   3/1970   Hodge et al. ............... 260/343.2

*Primary Examiner*—John M. Ford
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

New compounds are provided and have the formula

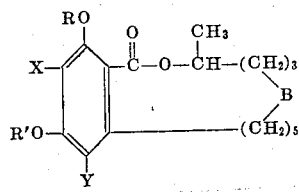

where B is

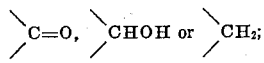

R and R' can be hydrogen, alkyl, acyl or aralkyl radicals; and X and Y are hydrogen or chlorine and at least one of X and Y is chlorine. These compounds exhibit antibacterial activity and can be used in animal feed compositions.

8 Claims, No Drawings

F.E.S. DERIVATIVES

The present invention relates to new compounds and an object of the present invention is to provide compounds which exhibit antibacterial activity or aid in increasing the rate of growth in meat-producing animals, e.g., cattle, lamb and swine.

The compounds of this invention are illustrated by the formula

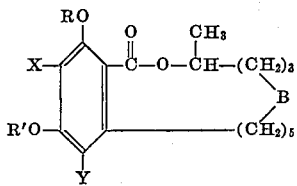

where B is

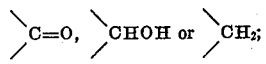

R and R' are hydrogen, substituted or unsubstituted alkyl radicals, e.g., lower alkyl such as methyl, ethyl, hexyl, etc., lower saturated acyclic acyl radicals such as acelyl, or aralkyl, e.g., benzyl or bromobenzyl radicals; and X and Y are hydrogen or chlorine and at least one of X and Y is chlorine. Compounds having the above formula where B is

and where R has the same meaning given above are also contemplated by the present invention.

The compounds can be administered to animals by any suitable method including oral and parenteral administrations. For example, the compounds can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention, can be used 40 4000 60 400 1.5 to control, e.g. inhibit cell growth, of noxious bacteria. They can be incorporated in ointments, for instance, for superficial application to control bacteria, e.g. *Staphyloccus aureus; Streptococcus feacalis; Streptococcus hemolytirus; Shigella dysenteriae;* and *Mycobacterium ranae.* One suitable ointment is a water-soluble polyethylene glycol ointment base composed of 40 parts by weight of Polyethylene Glycol 4000 and 60 parts by weight of Polyethylene Glycol 400 containing 1.5 parts by weight of a compound of the present invention.

The compounds of this invention can be prepared from dihydro F.E.S. compounds (B in the general formula is

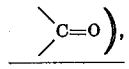

deoxytetrahydro F.E.S. compounds (B is

and tetrahydro F.E.S. compounds (B is

The dihydro F.E.S. compounds are described in U.S. Pat. No. 3,239,354; the deoxytetrahydro F.E.S. compounds are described in U.S. Pat. No. 3,239,341; and the tetrahydro F.E.S. compounds are described in U.S. Pat. No. 3,239,345; all of these patents herein incorporated by reference.

The compounds of the present invention can be prepared by reacting the given dihydro, deoxytetrahydro, or tetrahydro- F.E.S. compound with sulfuryl chloride at temperatures from about 0° to 25°C., and the resulting product mixture is recovered and purified by crystallization. In the production of the monochloro-compounds, about a 1 to 1 mole ratio of the sulfuryl chloride to the F.E.S. compound is used and about a 2 to 1 mole ratio of sulfuryl chloride to the F.E.S. compound is used to produce the dichloro-compounds.

The following examples will serve to illustrate the invention.

EXAMPLE I

Deoxytetrahydro F.E.S. wherein R, R', X and Y are hydrogen and B is

in the above general formula is used in this example. Sulfuryl chloride (1.675 g., 0.0124 mole) is added dropwise over 30 min. to a solution of deoxytetrahydro F.E.S. (3.672 g., 0.0120 mole) in chloroform (100 ml.) held at 0°–5°C. The reaction mixture is stirred at 25°C. for another 3 hours, is washed with water and extracted with sodium hydroxide solution (1 N, 3 × 25 ml.). This basic extract is acidified, and the oil product that separates is extracted with diethyl ether (3 × 50 ml.). The ether extract is washed with water, dried (with MgSO₄) and evaporated to give a solid product. An n.m.r. spectrum of the crude product shows that it contains 15–20 percent of unreacted deoxytetrahydro F.E.S. The product is recrystallized from ligroin (30°–60°C.). The first crop of crystalline material is a mixture of deoxytetrahydro F.E.S. and its monochloro derivative. However, the second crop obtained is nearly pure. Two further recrystallizations from ligroin (30°– 60°C.) gave pure monochlorodeoxytetrahydro F.E.S having a melting point of 92°–93°C. The mass and n.m.r. spectra were consistent with the assigned structure. It had the following analysis

|  | C | H | Cl |
|---|---|---|---|
| Calcd.(for $C_{18}H_{25}O_4Cl$): | 63.4 | 7.4 | 10.4 |
| Found | 63.2 | 7.3 | 10.4 | and the following formula:

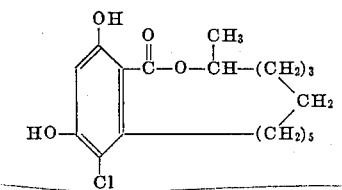

The following example illustrates the production of 3,5-dichloro deoxytetrahydro F.E.S.

EXAMPLE II

Essentially the same procedure used in Example I is followed. Deoxytetrahydro F.E.S. (0.60 g.) in chloroform (50 ml.) is treated with sulfuryl chloride (0.60 g., 2.2 molar excess). After the reaction mixture is stirred for 4 hours at 25°C., following the procedure of Example I, a crude dichloroderivative (0.6 g.) is obtained and it is purified after two recrystallizations from ligroin (60°–68°C.) to produce pure dichlorodeoxytetrahydro F.E.S. having a melting point of 121°–122°C. The mass and n.m.r. spectra were consistent with the assigned structure. It had the following analysis:

|  | C | H | Cl |
|---|---|---|---|
| Calcd. (for $C_{18}H_{24}O_4Cl_2$): | 57.6 | 6.4 | 18.9 |
| Found: | 57.8 | 6.6 | 18.8 | and has the formula:

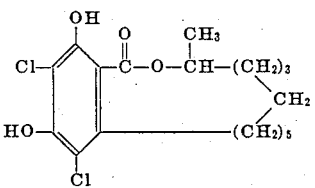

EXAMPLES III TO IX

Essentially the same procedure used in Example I is followed using compounds of the general formula

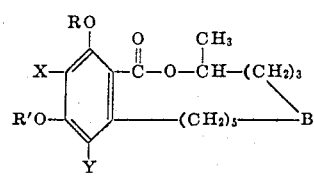

as starting compounds wherein the values for B, R, R', X and Y are set forth in Table A below for the respective examples. The products produced from these starting compounds also correspond in structure to the general formula and the values for B, R, R', X and Y of the products are set forth in Table B. As noted above, the starting compounds can be produced according to methods described in issued U.S. patents.

TABLE A.—STARTING COMPOUNDS

| Example | B | R | R' | X | Y |
|---|---|---|---|---|---|
| III | >CH₂ | —CH₃ | —CH₃ | H | H |
| IV | >CH₂ | —CH₂CH₃ | —CH₂CH₃ | H | H |
| V | >CH₂ | —C(O)—CH₃ | —CH₃ | H | H |
| VI | >CHOH | H | H | H | H |
| VII | >C=O | H | H | H | H |
| VIII | >CHOH | —CH₃ | —CH₃ | H | H |
| IX | >C=O | H | Benzyl | H | H |

TABLE B.—PRODUCT PRODUCED

| Example | B | R | R' | X | Y |
|---|---|---|---|---|---|
| III | >CH₂ | —CH₃ | —CH₃ | H | Cl |
| IV | >CH₂ | —CH₂CH₃ | —CH₂CH₃ | H | Cl |
| V | >CH₂ | —C(O)—CH₃ | —CH₃ | H | Cl |
| VI | >CHOH | H | H | H | Cl |
| VII | >C=O | H | H | H | Cl |
| VIII | >CHOH | —CH₃ | —CH₃ | H | Cl |
| IX | >C=O | H | Benzyl | H | Cl |

EXAMPLE X

Essentially the same procedure used in Example II is followed except that the 4-benzylether of dihydro F.E.S. is employed instead of the deoxytetrahydro F.E.S. to produce the 4-benzylether of 3,5-dichlorodihydro F.E.S. having the formula:

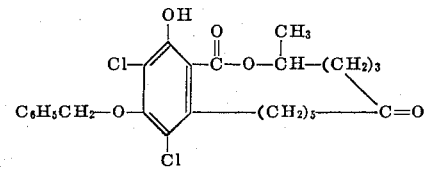

EXAMPLES XI TO XX

In each of these examples, six head of cattle are fed a daily ration of alfalfa hay and ground corn cobs containing from 5 to 20 ounces of each of the compounds of the present invention, produced in the above examples, per 100 pounds of feed and their rate of growth is improved.

The following are specific examples of animal feed compositions of this invention useful for increasing the rate of growth and feed efficiency of young animals to market weight.

EXAMPLES XXI TO XXX

In each of the examples, young beef cattle, i.e., calves to yearlings running to two year olds, each animal is given 5 to 20 milligrams per day of the compound produced in the example designated in Table C below which compound is intimately admixed in about 18 to 22 pounds per head per day of a complete pelleted ration for about 180 days. The complete pelleted ration includes in addition to the compound of the example designated in Table C the following:

| Barley | 40 | −43% |
|---|---|---|
| Molasses Dried Beet Pulp | 34.5 | −37.5% |
| Alfalfa Pellets | 8.0% | |
| Tallow | 2.5% | |
| Calcium Carbonate | .30% | |

| | |
|---|---|
| Urea | .30% |
| Phosphorus Source | .40% |
| Salt | .50% |
| Molasses | 10.00% |
| Trace Mineral | 0.5% |
| Vitamin A | 2–4 MMIU/Ton |

(NOTE: Milo or corn, for example, can be substituted for the barley.)

The compound of the given example is admixed with the above ingredients in a stationary blender or a feed mix truck in the following amounts in grams per ton to provide an appropriate complete pelleted feed with dosage levels ranging from 5 to 90 milligrams per head per day.

| Grams/Ton | Mg/Head/Day |
|---|---|
| 0.5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

TABLE C

| Example | Compound of This Invention Produced in The Following Example |
|---|---|
| XXI | I |
| XXII | II |
| XXIII | III |
| XXIV | IV |
| XXV | V |
| XXVI | VI |
| XXVII | VII |
| XXVIII | VIII |
| XXIX | IX |
| XXX | X |

EXAMPLE XXXI

For young swine, i.e., six week old pigs to about 100 pound pigs, each animal is given 5 to 20 milligrams per day of the compound of Example I intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example I intimately admixed in about 5½ to 10 pounds per head per day of a finisher ration until it reaches market weight of about 220 pounds. The grower and finisher ration include in addition to the compound of Example I, the following:

| | Grower | Finisher |
|---|---|---|
| Ground Yellow Corn | 77% | 86.7% |
| Soybean Meal (44% protein) | 16% | 6.5% |
| Meat and Bone Scraps (50% protein) | 2.5% | 2.5% |
| Dehydrate Alfalfa Meal (17%) | 2.5% | 2.5% |
| Steamed Bone Meal | 0.5% | 0.5% |
| Ground Limestone | 0.5% | 0.3% |
| Iodized Salt | 0.5% | 0.5% |
| Vitamin, Antibiotic & Trade Mineral Premix | 0.5% | 0.5% |

The compound of Example I is admixed with the above ingredients in a blender in the following amounts in milligrams per pound to provide an appropriate feed with dosage levels ranging from 6 to 96 milligrams per head per day.

| Mg/Pound | Mg/Head/Day |
|---|---|
| 2 | 6 |
| 4 | 12 |
| 8 | 24 |
| 16 | 48 |
| 32 | 96 |

EXAMPLE XXXII

For 4 to 10 month old lambs weighing 50 to 70 pounds, each animal is given 1 to 15 milligrams per day of the compound of Example II, intimately admixed in about 3 to 6 pounds per head per day of a complete ration for 30 to 90 days. The complete ration includes in addition to the compound of Example II the following:

| | pounds |
|---|---|
| Finely Ground Corn Cobs | 630 |
| Ground Corn | 600 |
| Dehydrated Alfalfa Meal | 300 |
| Dried Molasses | 120 |
| Soybean Meal (44% Protein) | 300 |
| Dicalcium Phosphate | 14 |
| Trace Mineral Salt | 17 |
| Premix Vitamin, Mineral & Antibiotic | 19 |

The compound of Example II is admixed with the above ingredients in a blender in the following amounts in milligrams per pound to provide an appropriate complete feed with dosage levels ranging from 1 to 15 milligrams per head per day.

| Mg/Pound | Mg/Head/Day |
|---|---|
| 0.5 | 2 |
| 1.0 | 4 |
| 1.5 | 6 |
| 2.0 | 8 |
| 2.5 | 10 |
| 3.75 | 15 |

EXAMPLE XXXIII

For broilers, i.e., day old to 4 week old chicks, a grower feed is prepared for feeding to the chicks for the first 4 weeks and a finisher feed is prepared for feeding the 4 week old chicks for the last 5 weeks until they reach market weight of 2½ to 3 pounds dressed. For each pound of weight gain, the chicks eat about 1.5 to 2 pounds of feed. Thus they eat about 1.5 pounds of feed during the first 4 weeks and above 5 pounds of feed during the next 5 weeks. During the course of this feeding schedule, each bird should receive a total of about 12 to 36 milligrams of the compound of Example I in the grower and finisher feed each of which includes in addition to the compound of Example I the following:

| | Grower lb. | Finisher lb. |
|---|---|---|
| Ground Yellow Corn | 1000 | 1200 |
| Soybean Meal (44% Protein) | 700 | 500 |
| Fish Meal (60% Protein) | 100 | 80 |
| Alfalfa Meal | 50 | 50 |
| Meat & Bone Scraps | 0 | 30 |
| Animal Fat | 80 | 80 |
| Dicalcium Phosphate | 35 | 40 |
| Iodized Salt | 10 | 10 |
| Limestone | 15 | — |
| Premix Vitamins Trade Minerals and Antibiotics | 10 | 10 |

It is claimed:
1.

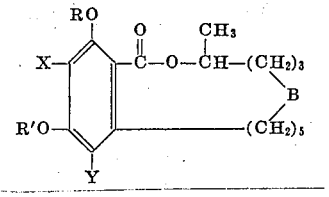

wherein B is a radical selected from the group consisting of

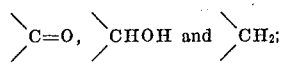

R and R' are selected from the group consisting of hydrogen, lower alkyl, lower alkanoyl, benzyl, and bromobenzyl; and X and Y are selected from the group consisting of hydrogen and chlorine and at least one of X and Y is chlorine.

2. A compound of claim 1 wherein at least one of R and R' is benzyl or bromobenzyl.

3. A compound of claim 1 wherein X and Y are chlorine.

4. A compound of claim 1 wherein X is hydrogen and Y is chlorine.

5. A compound of claim 4 wherein B is $$\diagdown\!\!\!\diagup CH_2.$$

6. A compound of claim 4 wherein each of R and R' is hydrogen.

7. A compound of claim 3 wherein B is $$\diagdown\!\!\!\diagup CH_2.$$

8. A compound of claim 7 wherein each of R and R' is hydrogen.

* * * * *